United States Patent
Kumar et al.

(10) Patent No.: US 11,722,391 B2
(45) Date of Patent: *Aug. 8, 2023

(54) DYNAMIC PREDICTION AND MANAGEMENT OF APPLICATION SERVICE LEVEL AGREEMENTS

(71) Applicant: Juniper Networks, Inc., Sunnyvale, CA (US)

(72) Inventors: Rajneesh Kumar, Bangalore (IN); Peyush Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,879

(22) Filed: Dec. 23, 2021

(65) Prior Publication Data

US 2022/0116297 A1     Apr. 14, 2022

Related U.S. Application Data

(63) Continuation of application No. 16/946,997, filed on Jul. 14, 2020, now Pat. No. 11,233,715.

(51) Int. Cl.
*H04L 43/0817* (2022.01)
*H04L 1/18* (2023.01)
(Continued)

(52) U.S. Cl.
CPC ............ *H04L 43/0817* (2013.01); *H04L 1/18* (2013.01); *H04L 41/5009* (2013.01);
(Continued)

(58) Field of Classification Search
None
See application file for complete search history.

(56) References Cited

U.S. PATENT DOCUMENTS

| | | | |
|---|---|---|---|
| 6,363,053 B1 * | 3/2002 | Schuster | H04L 43/50 709/227 |
| 6,651,099 B1 | 11/2003 | Dietz et al. | |

(Continued)

FOREIGN PATENT DOCUMENTS

| | | |
|---|---|---|
| CN | 101009595 A | 8/2007 |
| CN | 105474588 A | 4/2016 |
| WO | 2013184846 A1 | 12/2013 |

OTHER PUBLICATIONS

Boutaba et al., "A comprehensive survey on machine learning for networking: evolution, applications and research opportunities," Journal of Internet Services and Applications, Sep. 2018, 99 pp.

(Continued)

*Primary Examiner* — Ranodhi Serrao
(74) *Attorney, Agent, or Firm* — Shumaker & Sieffert, P.A.

(57) ABSTRACT

In general, the disclosure describes techniques for adaptively determining one or more parameters of a service level agreement of an application. For instance, a network device may monitor round-trip times of a plurality of packets of a data flow of an application being transmitted over a link between an application server and a client device. The network device may determine an amount of retransmission of packets occurring during transmission of the plurality of packets of the data flow. The network device may predict, based at least in part on the round-trip times of the plurality of packets of the data flow and the amount of retransmission of packets occurring during transmission of the plurality of packets of the data flow, a round-trip time parameter for a service level agreement associated with the application.

16 Claims, 4 Drawing Sheets

(51) Int. Cl.
*H04L 41/5009* (2022.01)
*H04L 43/0823* (2022.01)
*H04L 43/0864* (2022.01)
*H04L 43/18* (2022.01)
*H04L 47/2441* (2022.01)
*H04L 47/283* (2022.01)

(52) U.S. Cl.
CPC ...... *H04L 43/0823* (2013.01); *H04L 43/0864* (2013.01); *H04L 43/18* (2013.01); *H04L 47/2441* (2013.01); *H04L 47/283* (2013.01)

(56) References Cited

U.S. PATENT DOCUMENTS

| | | | |
|---|---|---|---|
| 6,771,646 B1 | 8/2004 | Sarkissian et al. | |
| 6,801,940 B1 | 10/2004 | Moran et al. | |
| 7,359,971 B2 | 4/2008 | Jorgensen | |
| 7,409,450 B2 | 8/2008 | Jorgensen | |
| 7,457,870 B1 | 11/2008 | Lownsbrough et al. | |
| 7,496,674 B2 | 2/2009 | Jorgensen | |
| 7,509,414 B2 | 3/2009 | Agarwal et al. | |
| 7,551,623 B1* | 6/2009 | Feroz | H04L 47/562 709/224 |
| 7,664,048 B1* | 2/2010 | Yung | H04L 41/5022 709/224 |
| 7,822,837 B1* | 10/2010 | Urban | H04L 43/00 709/223 |
| 7,944,822 B1 | 5/2011 | Nucci et al. | |
| 7,962,582 B2* | 6/2011 | Potti | H04L 45/563 370/400 |
| 8,190,674 B2* | 5/2012 | Narayanan | H04N 21/23805 709/217 |
| 8,310,928 B2* | 11/2012 | Samuels | H04L 67/56 370/231 |
| 8,396,807 B1 | 3/2013 | Yemini et al. | |
| 10,623,465 B2* | 4/2020 | Moon | H04L 65/80 |
| 10,701,761 B2* | 6/2020 | Jang | H04W 36/08 |
| 10,708,144 B2* | 7/2020 | Mohan | H04L 47/2425 |
| 11,005,729 B2* | 5/2021 | Jain | H04L 41/5067 |
| 11,063,785 B2* | 7/2021 | Milescu | H04L 47/283 |
| 11,233,715 B1 | 1/2022 | Kumar et al. | |
| 2002/0129157 A1* | 9/2002 | Varsano | H04L 47/283 709/224 |
| 2002/0145981 A1* | 10/2002 | Klinker | H04L 47/762 370/244 |
| 2003/0229708 A1 | 12/2003 | Lie et al. | |
| 2005/0165948 A1* | 7/2005 | Hatime | H04L 47/12 709/234 |
| 2007/0038736 A1 | 2/2007 | Jorgensen | |
| 2007/0038750 A1 | 2/2007 | Jorgensen | |
| 2007/0038751 A1* | 2/2007 | Jorgensen | H04L 69/163 709/226 |
| 2007/0038752 A1 | 2/2007 | Jorgensen | |
| 2007/0076606 A1 | 4/2007 | Olesinski et al. | |
| 2008/0155087 A1 | 6/2008 | Blouin et al. | |
| 2009/0285201 A1 | 11/2009 | Ben-Haim et al. | |
| 2011/0276951 A1 | 11/2011 | Jain | |
| 2012/0155398 A1 | 6/2012 | Oyman et al. | |
| 2012/0278441 A1 | 11/2012 | Li et al. | |
| 2012/0327772 A1* | 12/2012 | Samuels | H04L 47/10 370/235 |
| 2012/0330711 A1 | 12/2012 | Jain et al. | |
| 2014/0064080 A1 | 3/2014 | Stevens et al. | |
| 2015/0156082 A1 | 6/2015 | Kakadia et al. | |
| 2015/0188767 A1 | 7/2015 | Li et al. | |
| 2015/0195171 A1* | 7/2015 | Mermoud | H04L 43/0864 370/253 |
| 2015/0195745 A1 | 7/2015 | Farmanbar et al. | |
| 2016/0112896 A1 | 4/2016 | Karampatsis et al. | |
| 2017/0126564 A1 | 5/2017 | Mayya et al. | |
| 2018/0191588 A1* | 7/2018 | Kuemmel | H04L 43/062 |
| 2019/0052553 A1 | 2/2019 | Subramanian et al. | |
| 2019/0386918 A1 | 12/2019 | Iyer et al. | |
| 2020/0259896 A1* | 8/2020 | Sachs | G07C 9/00174 |
| 2020/0382435 A1* | 12/2020 | Holm | H04L 47/56 |

OTHER PUBLICATIONS

Extended Search Report from counterpart European Application No. 20199817.6, dated Nov. 26, 2020, 8 pp.
Kooij et al., "SLA Calculus for End-To-End QOS of TCP-Based Applications in a Multi-Domain Environment," Delft University of Technology, the Netherlands, Mar. 2006, 8 pp.
Prosecution History from U.S. Appl. No. 11/233,715 now issued U.S. Appl. No. 11/233,715, dated Sep. 29, 2021 through Dec. 20, 2021, 18 pp.
Siekkinen "Root Cause Analysis of TCP Throughput: Methodology, Techniques, and Applications," Universite De Nice-Sophia Antipolis—UFR Sciences, Oct. 2006, 223 pp.
Response to Extended Search Report dated Nov. 26, 2020, from counterpart European Application No. 20199817.6 filed Jul. 19, 2022, 11 pp.

* cited by examiner

DYNAMIC PREDICTION AND MANAGEMENT OF APPLICATION SERVICE LEVEL AGREEMENTS

This application is a continuation of U.S. application Ser. No. 16/946,997, filed Jul. 14, 2020, the entire content of which is herein incorporated by reference.

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for evaluating traffic flows for a particular application to adaptively predict the service-level agreement (SLA) parameters for the application in order to assign traffic originating from the application to a link with quality of experience (QoE) metrics that satisfy the predicted SLA parameters for the application.

In some Software-Defined Wide Area Networks (SD-WANs), a SD-WAN routing appliance may select a path for data flows sent by applications to client devices using SLA parameters and various QoE metrics of the WAN links. SLA parameters may be application specific, so that data flows of different applications may have different SLA parameters. While network administrators may attempt to manually configure SLA parameters, such as round-trip time and jitter, for different applications based on the network administrators' own experience and knowledge, network administrators may lack the knowledge to optimally configure SLA parameters for different applications.

An SD-WAN system may implement the techniques of this disclosure to perform end-to-end monitoring of data flows of applications between application servers and client devices and to perform, based on such end-to-end monitoring of data flows, self-learning to adaptively predict one or more SLA parameters of the applications. Specifically, for an application's data flow being transported via Transmission Control Protocol (TCP) over a link to a client device, the SD-WAN system may perform TCP sequence number analysis to track the round-trip time, jitter, retransmissions, and packet loss of an application's data flow between application servers and client devices to determine one or more SLA parameters of the applications.

The SD-WAN system may determine for an application's data flow over a link, given the round-trip time experienced by packets of the data flow, whether the application's data flow is experiencing retransmission of packets based on monitoring the application's data flow for packet retransmissions. If the SD-WAN system determines that the application's data flow is not experiencing TCP transmission of packets for a given round-trip time, SD-WAN system may set the round-trip time parameter of the SLA parameters for the application to the round-trip time experienced by the application's data flow. On the other hand, if the SD-WAN system determines that the application's data flow is experiencing TCP retransmission of packets, the retransmission of packets may be an indicator of link degradation, the SD-WAN system may determine that the current round-trip time of packets is not an optimal round-trip time for the application's data flow. As round-trip time experienced by packets of the application's data flow changes, the SD-WAN system may continue to monitor the application's data flow for retransmission of packets, and may adjust the round-trip time parameter of the SLA parameters for the application based on such monitoring of the application's data flow. In this way, the SD-WAN system may adaptively predict the SLA parameters for the application.

There may be one or more advantages to using the techniques described herein. The techniques described herein man enable SD-WAN systems to adaptively predict one or more SLA parameters of applications without user intervention. That is, instead of a network administrator that manually sets one or more SLA parameters of applications, the techniques describe herein may enable SD-WAN systems to determine one or more SLA parameters of applications based on the actual data flows of applications within SD-WAN systems. By adaptively predicting the one or more SLA parameters based on the actual end-to-end data flow of applications to client devices, the techniques described herein may be able to determine SLA parameters that are based on actual network conditions of links in the SD-WAN systems, thereby producing SLA parameters that are potentially better suited for the actual network conditions in the SD-WAN systems compared with manually determined SLA parameters. As such, the techniques described herein may provide a better experience for the end user and better resource utilization of the overall network.

In one example of the techniques described herein, a method is described. The method includes monitoring, by a network device, round-trip times of a plurality of packets of a data flow of an application being transmitted over a link between an application server and a client device. The method further includes determining, by the network device, an amount of retransmission of packets occurring during transmission of the plurality of packets of the data flow. The method further includes predicting, by the network device and based at least in part on the round-trip times of the plurality of packets of the data flow and the amount of retransmission of packets occurring during transmission of the plurality of packets of the data flow, a round-trip time parameter for a service level agreement (SLA) associated with the application.

In another example of the techniques described herein, a network device is described. The network device includes a memory. The network device further includes one or more processors in communication with the memory, the one or more processors configured to monitor round-trip times of a plurality of packets of a data flow of an application being transmitted over a link between an application server and a client device; determine an amount of retransmission of packets occurring during transmission of the plurality of packets of the data flow; and predict, based at least in part on the round-trip times of the plurality of packets of the data flow and the amount of retransmission of packets occurring during transmission of the plurality of packets of the data flow, a round-trip time parameter for a service level agreement (SLA) associated with the application.

In another example of the techniques described herein, a non-transitory computer-readable storage medium storing instructions thereon is described. The instructions, when executed cause one or more processors, via execution of a software-defined networking (SDN) device, to: monitor round-trip times of a plurality of packets of a data flow of an application being transmitted over a link between an application server and a client device; determine an amount of retransmission of packets occurring during transmission of the plurality of packets of the data flow; and predict, based at least in part on the round-trip times of the plurality of packets of the data flow and the amount of retransmission of packets occurring during transmission of the plurality of packets of the data flow, a round-trip time parameter for a service level agreement (SLA) associated with the application.

The details of one or more examples are set forth in the accompanying drawings and the description below. Other features, objects, and advantages will be apparent from the description and drawings, and from the claims.

DETAILED DESCRIPTION

Figure 1:
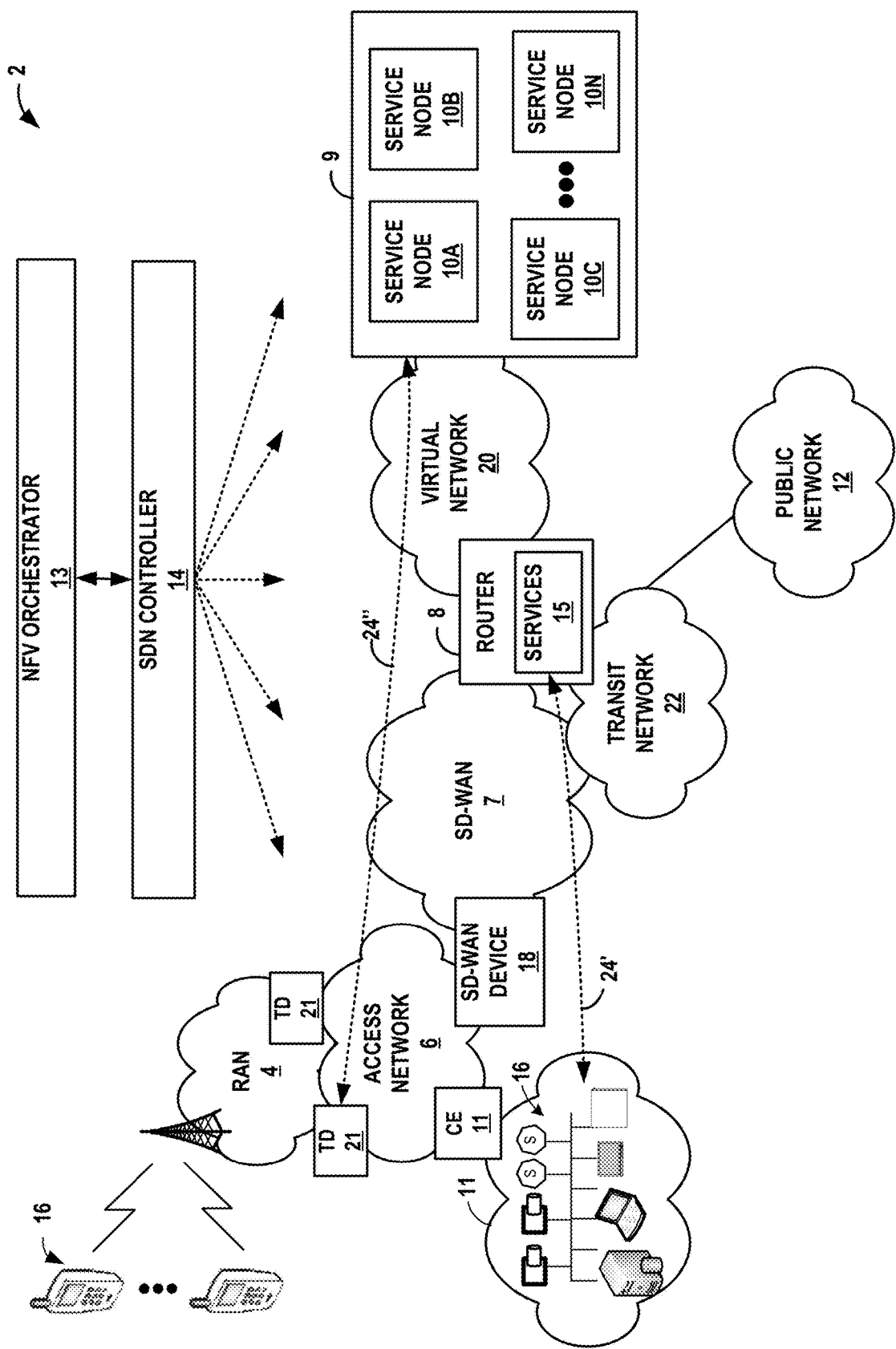
FIG. 1 is a block diagram illustrating an example software-defined wide area network system that adaptively determines service level agreement parameters for an application in order to assigns traffic originating from the application to a link, in accordance with the techniques of this disclosure.

FIG. 1 is a block diagram illustrating an example software-defined wide area network system that adaptively determines service level agreement parameters for an application in order to assigns traffic originating from the application to a link, in accordance with the techniques of this disclosure. The example network system of FIG. 1 includes an SD-WAN system 2 that includes a public network and a private network to provide packet-based network services to subscriber devices 16. That is, SD-WAN system 2 provides authentication and establishment of network access for subscriber devices 16 such that a subscriber device may begin exchanging data packets with public network 12, which may be an internal or external packet-based network such as the Internet.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services. In some examples, public network 12 may represent the Internet. In some examples, public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In general, subscriber devices 16 connect to gateway router 8 via access network 6 to receive connectivity to subscriber services for applications hosted by public network 12 or router 8. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN device 18 may be a customer edge (CE) router, a provider edge (PE) router, a firewall, an SD-WAN appliance, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers.

In examples of SD-WAN system 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of SD-WAN system 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of SD-WAN system 2 typically offers services to subscribers associated with devices, e.g., subscriber devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN device 18 or router 8. In turn, software-defined wide area network ("SD-WAN") device 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN device 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 8. In addition, or alternatively, SD-WAN system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN device 18 has authenticated and established access sessions for the subscribers, SD-WAN device 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN device 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, SD-WAN system 2 comprises a software defined network (SDN) and network functions virtualization (NFV) architecture. SDN controller 14 may provide a high-level controller for configuring and managing the routing and switching infrastructure of SD-WAN system 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within SD-WAN system 2 may perform end-to-end application data monitoring using various application quality of experience (QoE) metric functions, such as real-time performance monitoring (RPM) or two-way active measurement protocol (TWAMP), for example. That is, RPM and TWAMP may be used within SD-WAN system 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions.

SD-WAN system 2 may determine QoE metrics, such as service level agreement (SLA) metrics that include round-trip time, jitter, and packet loss, which were influenced by applications' real-time parameters like packet size, queues and burst of packets to determine the best path. QoE aims to improve the user experience at the application level by constantly monitoring the class-of-service parameters and SLA compliance of application traffic, ensuring that the application data is sent over the most SLA-compliant link available. In particular, when transmitting application traffic, SD-WAN system 2 may attempt to select links for transmitting the application traffic that satisfy the SLA parameters of the applications.

In accordance with the techniques described herein, one or more components of SD-WAN system 2, such as router 8, NFV orchestrator 13, SDN controller 14, or SD-WAN device 18, may implement techniques to predict the SLA parameters for an application by monitoring the end-to-end data flow of the application. SD-WAN system 2 may use the predicted set of SLA parameters to direct SD-WAN device 18 to find an optimal link to send the data flow to the intended destination.

In some examples, SD-WAN system 2 may implement probe-less techniques to predict the SLA parameters such as round-trip time, jitter, and TCP retransmission, for a new data flow for which the SLA parameters are not initially known. That is, SD-WAN device 18 may adaptively determine the SLA parameters for a data flow without sending any test packets or probe packets, in order to find a suitable link for sending the data flow to the intended destination. Instead, SD-WAN system 2 may, based on monitoring the data flow, predict SLA parameters for the data flow. SD-WAN system 2 may, based on the predicted SLA parameters for the data flow, determine an appropriate link for transmitting the data flow that meets the predicted SLA parameters.

In some examples, SD-WAN system 2 may predict the SLA parameters for a data flow that is transported via Transmission Control Protocol (TCP). TCP uses a technique known as positive acknowledgement with retransmission which requires the receiver to respond with an acknowledgement message as it receives the data. The sender may maintain a record of each packet sent by the sender and may maintain a retransmission timer of a certain length. If the retransmission timer for a packet sent by the sender expires prior to the sending receiving an acknowledgement from the receiver, the sender retransmit the packet to the receiver. Occurrence of such retransmissions of packets may provide a poor experience to end users and may also increase the load of the network. In the example of a data flow that carries streaming video, retransmissions of packets of the data flow may cause the video being streamed to stutter.

SD-WAN system 2 may determine SLA parameters for a data flow that reduces the amount of retransmissions by monitoring the data flow of an application over one or more links. For example, SD-WAN system 2 may determine a round-trip time parameter for an application based on monitoring for round-trip time of packets of the application data flow, retransmission of packets of the application's data flow, and jitter when the data flow is being transmitted over a link. SD-WAN system 2 may feed the data collected while monitoring the application's data flow into an SLA management engine that may be able to adaptively determine or predict, based on the collected data, SLA parameters for the application.

In accordance with aspects of the present disclosure, SD-WAN system 2 may monitor the round-trip times of packets of a data flow of an application being transmitted over a link between an application server and a client device. SD-WAN system 2 may determine the amount of retransmission during transmission of the packets of the data flow by monitoring the amount of packet retransmissions occurring during transmission of the data flow over the link. SD-WAN system 2 may determine, based at least in part on the round-trip times of the packets of the data flow and the amount of retransmission during transmission of the data flow over the link, a round-trip time parameter for the SLA associated with the application.

In some examples, if SD-WAN system 2 determines that the amount of retransmission experienced by the data flow is below a predefined retransmission threshold, SD-WAN appliance may determine that the round-trip time experienced by the data flow is a "good" value. As such, SD-WAN system 2 may set the round-trip time parameter for the SLA associated with the application to the round-trip time experienced by packets of the data flow. In some examples, if SD-WAN system 2 determines that the amount of retransmission experienced by the data flow is at or above the predefined retransmission threshold, SD-WAN appliance may refrain from setting the round-trip time parameter for the SLA associated with the application to the round-trip time experienced by packets of the data flow. In some examples, the predefined retransmission threshold may specify a number of retransmissions, such as 1 retransmission, 2 retransmissions, and the like, and may be predefined in SD-WAN system 2, such as being programmed by a network administrator, being programmed at the factory, and the like.

SD-WAN system 2 may adaptively adjust the round-trip time parameter for the SLA of a data flow based on monitoring the round-trip times of packets of the data flow and the amount of retransmissions occurring during transmission of the data flow over links. As a data flow is being transmitted through a link, the round-trip times of packets of the data flow may change (e.g., increase and/or decrease), such as due to changes in network conditions of the link (e.g., increase or decrease in network traffic carried by the link). As the round-trip times of the packets of the data flow changes, SD-WAN system 2 may adaptively determine whether to change the round-trip time parameter for the SLA of the data flow based on the changes to the round-trip time of the packets of the data flow.

Specifically, SD-WAN system 2 may increase the round-trip time parameter for the SLA of a data flow if the amount of retransmissions experienced by the data flow remains below the predefined retransmission threshold given an increase in the round-trip times of packets of the data flow. For example, if SD-WAN system 2 determines that packets of a data flow being transmitted over a link has a first round-trip time, and if SD-WAN system determines that the data flow being transmitted over the link has a rate of retransmissions that is below a predefined retransmission threshold value, SD-WAN system 2 may set the round-trip time parameter for the SLA of the data flow to the first round-trip time. If the round-trip time of the packets of the data flow changes from the first round-trip time to a second round-trip time that is larger than the first round-trip time, the data flow, SD-WAN system 2 may determine whether the data flow experiences an amount of retransmissions that is still below the predefined retransmission threshold. If SD-WAN system 2 determines that the data flow still experiences an amount of retransmissions that is still below the predefined retransmission threshold, SD-WAN system 2 may set the round-trip time parameter for the SLA associated with the application to the second round-trip time.

For example, SD-WAN system 2 may monitor a data flow of an application being transmitted over a link, where the round-trip time of packets of the data flow is 30 milliseconds (ms) in a first window of time and may monitor the data flow for retransmission of packets in the data flow during the first window of time, where the predefined retransmission threshold is 1. If SD-WAN system 2 does not detect any retransmission of packets in the data flow during the first window of time when the link has an round-trip time of 30 ms, SD-WAN system 2 may set the round-trip time parameter for the SLA associated with the application to the round-trip time of the packets of the data flow, which is 30 ms.

In a second window of time, the round-trip time of packets of the data flow of the application transmitted through the link may change from 30 ms to 50 ms, such as due to additional load being transmitted through the link. SD-WAN system 2 may continue to monitor the data flow being transmitted over the link in the second window of time to monitor the data flow for retransmission of packets in the data flow. If SD-WAN system 2 detects retransmissions of packets in the data flow during the second window of time, SD-WAN system 2 may refrain from changing the round-trip time parameter for the SLA associated with the application from its value of 30 ms to the round-trip time of the packets of the data flow during the second window, which is 50 ms.

In a third window of time, the round-trip time of packets of the data flow of the application being transmitted over the link may change to 40 ms. SD-WAN system 2 may continue to monitor the data flow being transmitted over the link in the third window of time to monitor the data flow for retransmission of packets in the data flow. If SD-WAN system 2 does not detect any retransmissions of packets in the data flow during the third window of time, SD-WAN system 2 may change the round-trip time parameter for the SLA associated with the application from a value of 30 ms to a value of 40 ms.

As can be seen, SD-WAN system 2 may determine an initial round-trip time parameter for the SLA of an application and may be able to adaptively increase the round-trip time parameter for the SLA associated with the application if the increased value of the round-trip time parameter does not increase the retransmission of packets in the data flow. Because the round-trip time parameter for a data flow may be an upper value for round-trip time, a data flow can be transmitted on links having a round-trip time equal to or less than the round-trip time parameter for the SLA associated with the application without increasing the amount of retransmission of the data flow. Thus, by increasing the round-trip time parameter for the SLA associated with the application, SD-WAN system 2 may be able to increase the number of links having quality of experience metrics that may meet the SLA associated with the application.

In some examples, different sessions or instances of an application may send different data flows over different links, and packets of the different data flows may experience different round-trip time. SD-WAN system 2 may therefore monitor the different data flows of the application over the different links in order to determine a round-trip time parameter for the SLA associated with the application. For example, an application may transmit a first data flow over a first link, and packets of the first data flow may experience a first round-trip time (e.g., 40 ms). An application may transmit a second data flow over a second link, and packets of the second data flow may experience a second round-trip time (e.g., 30 ms). If SD-WAN system 2 detects retransmissions of packets for the first data flow being transmitted over the first link but does not detect any retransmissions of packets for the second data flow being transmitted over the second link, SD-WAN system 2 may set the round-trip time parameter for the SLA associated with the application to the second round-trip time (e.g., 30 ms).

SD-WAN system 2 may use the SLA associated with the application to select a link in SD-WAN system 2 for transmitting data flows of the application. In particular, SD-WAN system 2 may select, for an application, a link having quality of experience metrics that meet the SLA associated with application. For example, SD-WAN system 2 may, for an application having an SLA that specifies a round-trip time parameter of 40 ms, select a link for transmitting data flows of the application that can meet the round-trip time parameter of 40 ms.

There may be one or more advantages to using the techniques described herein. The techniques described herein man enable SD-WAN system 2 to adaptively predict one or more SLA parameters of applications without user intervention. By adaptively predicting the one or more SLA parameters based on the actual end-to-end data flow of applications to client devices, the techniques described herein may be able to determine SLA parameters that are based on actual network conditions of links in SD-WAN system 2, thereby producing SLA parameters that are potentially better suited for the actual network conditions in SD-WAN system 2 compared with manually determined SLA parameters. For example, by using the SLA parameters of an application to select a link that meets the round-trip time parameter for the SLA of an application, SD-WAN system 2 may minimize the amount of TCP retransmission experienced by data flows of the application. The techniques may also provide information for the SD-WAN system 2 to shift application data flows away from over-utilized links, and avoid other links with available bandwidth from becoming underutilized. As such, the techniques described herein may provide a better experience for the end user and better resource utilization of the overall network.

Figure 2:
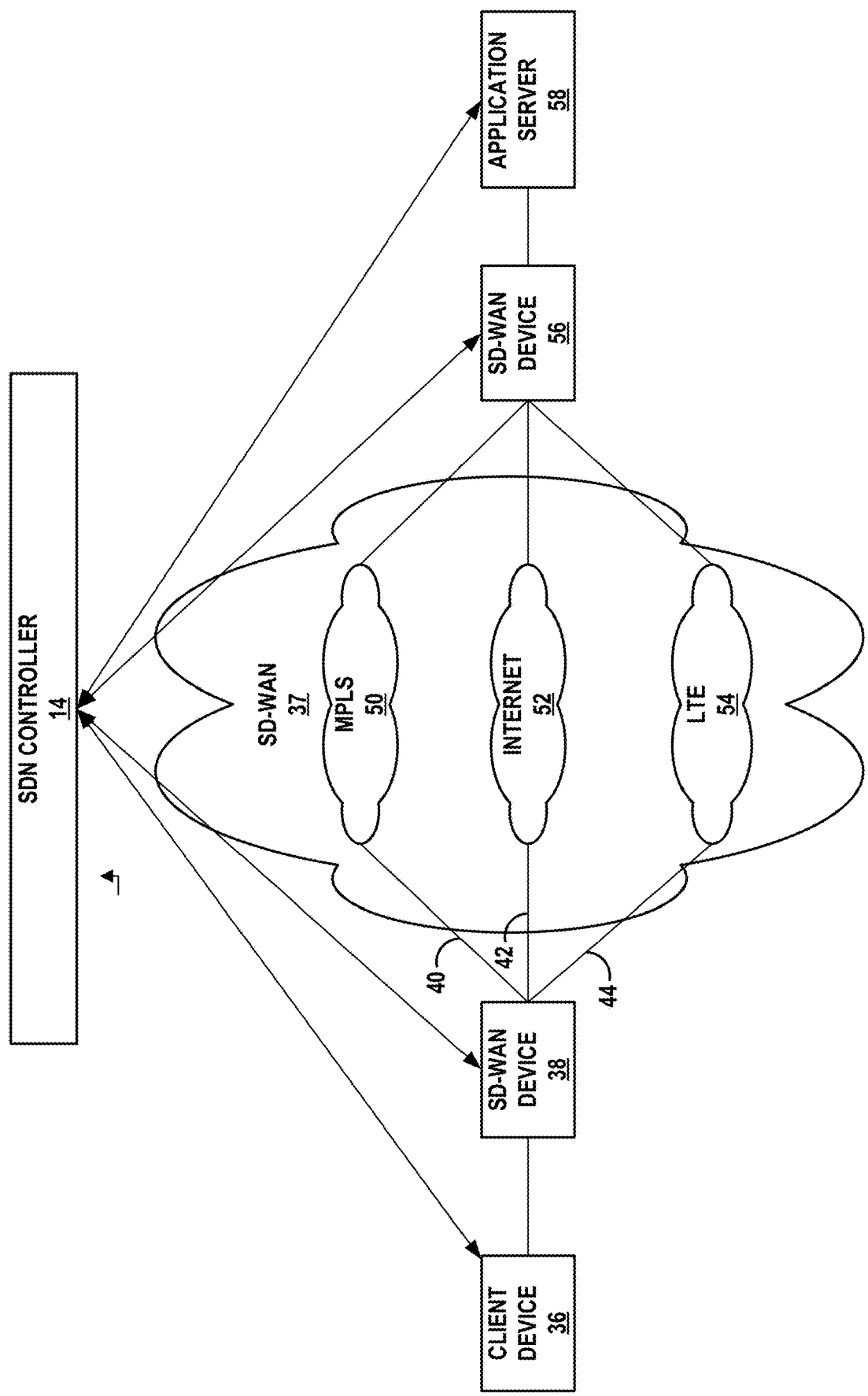
FIG. 2 is a block diagram illustrating an example software-defined wide area network, in accordance with one or more techniques of this disclosure.

FIG. 2 is a block diagram illustrating an example SD-WAN, in accordance with one or more techniques of this disclosure. In the example described herein, SD-WAN 37 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 37 may include any number of links of any suitable type for transmitting data flows between the client side (e.g., client device 36 and SD-WAN appliance 38) and the application side (e.g., SD-WAN appliance 56 and application server 58).

In some examples, SD-WAN appliance 56 periodically sending probe packets of various sizes to each of the potential WAN links 40, 42, and 44 in order to keep up-to-date records of the metrics for WAN links 40, 42, and 44 such that the data flow may be routed swiftly upon receipt. For instance, SD-WAN appliance 56 may have a reference data store with indications of probe packets of various data packet sizes in data flows typically handled by SD-WAN appliance 56. Periodically, the network device may send multiple probe packets (e.g., one of each size specified in the reference data store) to each of the available WAN links 40, 42, and 44 in order to obtain current metrics for the specific WAN link if the WAN link was to transmit a data flow having the respective packet size, storing these metrics in the reference data store.

For example, SD-WAN appliance 56 may receive a data flow of an application. SDN controller 14 may monitor the data flow of the application to determine the SLA associated with the application, such as via the techniques described above. SDN controller 14 may, in response to determining the SLA associated with the application, send an indication of the SLA associated with the application to SD-WAN appliance 56.

SD-WAN appliance 56 may determine which of links 40, 42, and 44 has quality of experience metrics that satisfy the SLA associated with the application, and SD-WAN appliance 56 may assign the data flow to the link that satisfies the SLA associated with the application. For example, SD-WAN appliance 56 may, in response to determining that the quality of experience metrics for internet link 42 would satisfy the SLA associated with the application, assign the data flow to be transmitted via internet link 42.

Figure 3:
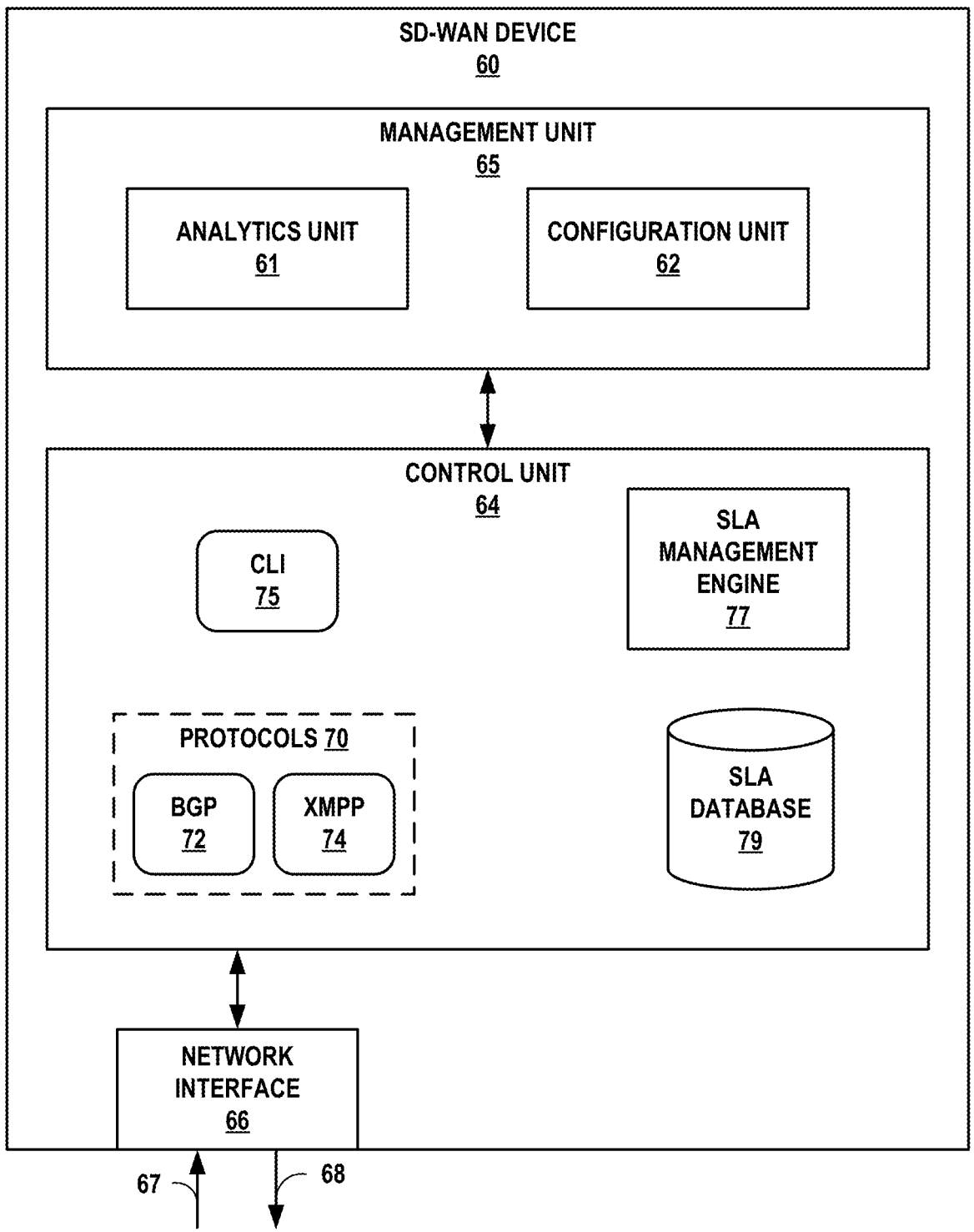
FIG. 3 is a block diagram illustrating an example SD-WAN device configured to implement the techniques described herein.

FIG. 3 is a block diagram illustrating an example SD-WAN device configured to implement the techniques described herein. In the example of FIG. 3, SD-WAN device 60 may be described herein within the context of SD-WAN system 2 of FIG. 1, and may represent any suitable component of SD-WAN system 2, such as NFV orchestrator 13, SDN controller 14, routers 8, and SD-WAN device 18, for example. Moreover, while described with respect to a particular network device, e.g., SDN controller 14, a router or SD-WAN appliance, the techniques may be implemented by any network device that may operate as a network device in SD-WAN system 2, such as a client device, a Layer 3 (L3) or above network device, a server, or any other network device that can act as a TCP proxy, a TCP monitor, a TCP tracker, and the like. In some examples, SD-WAN device may be a device executing an SD-WAN Network Function Virtualization (NFV), a device that provides a firewall in SD-WAN system 2, or a device executing SD-WAN functionality described herein as a cloud-based service.

SD-WAN device 60 may operate as a network services controller for a service provider network, such as in SD-WAN system 2. Specifically, SD-WAN device 60 may perform end-to-end monitoring of application data flows transmitted within a network that contains or is managed by SD-WAN device 60 in order to determine one or more parameters of SLAs for applications.

In the illustrated example of FIG. 3, SD-WAN device 60 includes a management unit 65, a control unit 64 for controlling operation of SD-WAN device 60, and a network interface 66 for exchanging packets with network devices by inbound link 67 and outbound link 68. In some examples, control unit 64 and/or management unit 65 may be implemented as one or more processes executing on one or more virtual machines of one or more physical computing devices. That is, while generally illustrated and described as executing on a single SD-WAN device 60, aspects of each of these units may be delegated to or distributed across other computing devices.

Each of control unit 64 and/or management unit 65 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein.

Alternatively, or additionally, each of control unit 64 and/or management unit 65 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SD-WAN device 60 illustrated in FIG. 3 is shown for example purposes only and should not be limited to this architecture. In other examples, SD-WAN device 60 may be implemented in a variety of ways, such software only, hardware only, or a combination of both software and hardware.

Management unit 65 may comprise a management layer of SD-WAN device 60, whereas control unit 64 may comprise a control layer of SD-WAN device 60. Management unit 65 includes an analytics unit 61 and a configuration unit 62. Analytics unit 61 may capture information from physical and/or virtual network elements within SD-WAN system 2, e.g., a gateway, service nodes 10, or of each data center 9 of FIG. 1, or from application server 58 and/or client device 36 of FIG. 2, and analyze the information for use in managing the network services offered by the service provider. The information may include statistics, logs, events, and errors.

For example, analytics unit 61 of management unit 65 may perform end-to-end monitoring of application data flows from application servers (e.g., application server 58) to client devices (e.g., client device 36). Specifically, analytics unit 61 may monitor application data flows transported via TCP for various metrics such as round-trip time, jitter, TCP retransmission, and the like that analytics unit 61 may send to SLA management engine 77. Analytics unit 61 may communicate, via network interface 66, with application servers, such as application server 58, to monitor data flows of applications running on the application servers as the data flows are being transmitted for metrics associated with the data flow and may feed such data into SLA management engine 77 as analytics unit 61 monitors the data flow to determine one or more parameters of SLAs for applications.

For example, to monitor the data flow of an application running on application server 58 to client device 36 over a link (e.g., one of WAN links 40, 42, and 44), analytics unit 61 may communicate with application server 58 to receive information regarding the data flow sent from application server 58 to client device 36. For example, analytics unit 61 may receive, for each packet of the data flow sent from application server 58 to client device, a sequence number of the packet, a timestamp of the packet indicative of the time the packet was sent, the acknowledgement of the packet received by application server 58, any retransmission of the packet by application server 58, and the like. Analytics unit 61 may, in response to receiving such information regarding the data flow of an application, send the received information to SLA management engine 77.

Analytics unit 61 may be able to monitor multiple data flows of multiple applications at the same time. That is, analytics unit 61 may be able to concurrently monitor multiple data flows being transmitted from the same instance of an application to the same or different client devices, multiple different data flows being transmitted from different instances of the same application to the same or different client devices, or multiple data flows being transmitted from different applications to the same or different client devices, and may send the received information from the monitored data flows to SLA management engine 77.

Configuration unit 62 stores configuration information for the network elements within SD-WAN system 2. In some examples, the configuration information comprises a virtual network configuration. Configuration unit 62 may translate a high-level data model of the intended virtual network configuration to a lower-level data model for use in interacting with the network elements.

Control unit 64 of SD-WAN device 60 implements a centralized control plane for SD-WAN system 2 that is responsible for maintaining a constantly changing network state. Control unit 64 interacts with the network elements within SD-WAN system 2 to maintain a consistent network state across all of the network elements. Control unit 64 provides an operating environment for a command line interface daemon 75 ("CLI 75") that provides an interface by which an administrator or other management entity may modify the configuration of SD-WAN device 60 using text-based commands. Control unit 64 also provides an operating environment for several protocols 70, including Border Gateway Protocol (BGP) 72 and Extensible Messaging and Presence Protocol (XMPP) 74 as illustrated in the example of FIG. 3. In accordance with the techniques described herein, these commands may alter which QoE metrics are to be measured, how SD-WAN device 60 constructs the topology of the network, and whether SD-WAN device 60 optimizes the distribution of the probing processes being performed across the node devices. The user configuration (e.g., intent-based configuration) may also configure the probes themselves, providing instructions as to whether the probes are active probes, passive probes, or a combination thereof.

In some examples, control unit 64 uses XMPP 74 to communicate with network elements within SD-WAN system 2, such as gateways 8, client devices 16, or service nodes 10 of data center 9 within SD-WAN system 2 of FIG. 1, by an XMPP interface (not shown). Virtual network route data, statistics collection, logs, and configuration information may be sent as extensible markup language (XML) documents in accordance with XMPP 74 for communication between SD-WAN device 60 and the network elements. Control unit 64 may also use XMPP 74 to communicate with one or both of analytics unit 61 and configuration unit 62 of SD-WAN device 60.

Control unit 64 further includes SLA management engine 77. SLA management engine 77 may enable control unit 64 to determine one or more parameters of SLA metrics for applications that transmit data flows to client devices within SD-WAN system 2. In accordance with the techniques described herein, SD-WAN device 60 may monitor application data flows over links of SD-WAN system 2 to determine one or more parameters associated with SLAs for applications within SD-WAN system 2. SLA management engine 77 may receive information associated with packets of a data flow of an application being transmitted over a link between an application server and a client device, and SLP management engine 77 may perform TCP sequence number analysis on the packets of the data flow to determine predicted values of one or more parameters of SLAs for the application. SLA management engine 77 may then store the predicted SLA parameter values to SLA database 79. A network device, such as a SD-WAN appliance, may use the SLA associated with the application to select a link for transmitting data flows of the application having quality of experience metrics that meet the SLA for the application.

SLA management engine 77 may receive, from analytics unit 61 and for each packet of a data flow sent by an application from application server 58 to client device, a sequence number of the packet, a timestamp of the packet indicative of the time the packet was sent, the acknowledgement of the packet received by application server 58, any retransmission of the packet by application server 58, and the like. SLA management engine 77 may be able to use such information to predict one or more parameters associated with SLAs for the application.

SLA management engine 77 may analyze the information associated with the packets of the data flow to monitor various data regarding the data flow. For example, SLA management engine 77 may monitor the end-to-end round-trip times of the packets of the data flow of the application being transmitted over a link between an application server and a client device. Specifically, SLA management engine 77 may, for each packet of the packet flow, determine a round-trip time for a packet of the data flow as the elapsed time between the application sending the packet to the client device and the application receiving an acknowledgement of the packet. SLA management engine 77 may be able to determine such a round-trip time for a packet by using the sequence numbers associated with the packet and the corresponding acknowledgement to identify the packet and the corresponding acknowledgement and by using the timestamp of the packet and the timestamp of the corresponding acknowledgement to determine the elapsed time between sending the packet and receiving the corresponding acknowledgement.

In addition to determining the round-trip times of packets in the packet flow, SLA management engine 77 may also determine the jitter of the data flow as the difference between the round-trip times of packets. SLA management engine 77 may, for each of two consecutive packets in the packet flow, determine a jitter for the two packets as the difference in the round-trip times of packets. For example, if SLA management engine 77 determines that a first packet in the data flow has a round-trip time of 30 ms and that a subsequent second packet in the data flow has a round-trip time of 40 ms, SLA management engine 77 may determine the jitter between the first packet and the second packet in the data flow to be 10 ms.

SLA management engine 77 may also determine an amount of TCP retransmission during transmission of the packets of the data flow. For a data flow of an application being transported via TCP, if the application does not receive an acknowledgement of a packet sent by the application within a specified amount of time, the application may retransmit the packet. SLA management engine 77 may determine that a retransmission of a packet has occurred in the data flow if SLA management engine 77 determines that the data flow includes two or more packets with the same sequence number that are sent by the application. By determining the amount of duplicate packets sent in the data flow, SLA management engine 77 may determine the amount of retransmission of packets in the data flow.

SLA management engine 77 may determine, based at least in part on the round-trip times of the packets of the data flow and the amount of retransmission during transmission of the packets of the data flow, a round-trip time parameter for a SLA associated with the application. Specifically, SLA management engine 77 may determine whether the amount of retransmission of packets in the data flow is below a retransmission threshold. In some examples, the retransmission threshold may specify a retransmission rate, which may be a number of retransmissions per a specified number of packets transmitted as part of the data flow. In some examples, the retransmission threshold may be a number, such as 1, 2, 3, and the like. In some examples, SLA management engine 77 may determine that the amount of retransmission of packets in the data flow is below the retransmission threshold if the amount of retransmissions of packets in the data flow is zero (i.e., there are no retransmissions of packets in the data flow).

If SLA management engine 77 determines that the amount of retransmission of packets in the data flow is below the retransmission threshold, SLA management engine 77 may determine the round-trip time parameter for the SLA associated with the application based on the round-trip times determined for the packets of the data flow. In some examples, SLA management engine 77 may determine a round-trip time for the data flow from the round-trip times determined for the packets of the data flow and may set the round-trip time parameter for the SLA to the determined round-trip time. However, if SLA management engine 77 determines that the amount of retransmissions of packets in the data flow is at or above the retransmission threshold, SLA management engine 77 may refrain from determining the round-trip time parameter for the SLA associated with the application based on the round-trip times determined for the packets of the data flow.

In some examples, if all of the round-trip times determined for the packets of the data flow have the same value, then SLA management engine 77 may determine the round-trip time for the data flow to be the value of any one of the round-trip times for the packets of the data flow. In some examples, SLA management engine 77 may determine the round-trip time of the data flow to be the mean round-trip time value or the median round-trip time value of the round-trip times for the packets of the data flow. In some examples, SLA management engine 77 may determine the round-trip time for the data flow to be the maximum round-trip time value out of the round-trip times for the packets of the data flow. SLA management engine 77 may also use any other suitable technique to determine a round-trip time for the data flow from the round-trip times determined for the packets of the data flow.

If a round-trip time parameter for the SLA associated with the application has not yet been determined, SLA management engine 77 may predict the round-trip time parameter associated with the SLA associated with the application to the round-trip time of the data flow and store the predicted round-trip time parameter for the application in SLA database 79. If a round-trip time parameter for the SLA associated with the application has been previously determined and stored in SLA database 79, SLA management engine 77 may compare the currently-determined round-trip time of the data flow with the round-trip time parameter for the SLA associated with the application to determine whether to set the round-trip time parameter for the SLA associated with the application to the currently-determined round-trip time of the data flow. Specifically, SLA management engine 77 may determine whether the currently-determined round-trip time of the data flow is larger than the round-trip time parameter for the SLA associated with the application.

As described above, setting the round-trip time parameter for the SLA associated with the application to a larger value may increase the number of links having quality of experience metrics that meet the quality of experience. As such, SLA management engine 77 may, in response to determining that the currently-determined round-trip time of the data flow is larger than the round-trip time parameter for the SLA associated with the application, set the round-trip time parameter for the SLA associated with the application to the currently-determined round-trip time of the data flow. In some examples, SLA management engine 77 may also set a jitter parameter for the SLA associated with the application to the jitter for the data flow and may store the jitter parameter for the application in SLA database 79. For example, the jitter for the data flow may be the mean or median jitter of the data flow determined by SLA management engine 77. SLA management engine 77 may therefore store the SLA parameters determined for the application in SLA database 79.

SLA management engine 77 may perform self-learning to adaptively determine the round-trip time parameter for the SLA associated with the application. That is, SLA management engine 77 may continually determine the round-trip time parameter for the SLA associated with the application. In some examples, because characteristics of the link through which the data flow is being transmitted may change, such as changes in the amount of load being carried by the link, the round-trip times of packets of the data flow being transmitted through the link may also change through time. As such, SLA management engine 77 may, in effect, divide up packets of a data flow of an application transmitted over a link into sequential groups of packets, and may determine the round-trip time and the amount of retransmissions of each of the groups of packets in the data flow. For example, SLA management engine 77 may determine the round-trip time and the amount of retransmissions of a first 100 packets of the data flow, determine the round-trip time and the amount of retransmissions of a second 100 packets of the data flow, determine the round-trip time and the amount of retransmissions of a third 100 packets of the data flow, and so on.

Thus, in response to determining the round-trip of the packets and the amount of retransmissions of packets for a first group of packets of the data flow of the application being transmitted over a link between the application server and the client device, SLA management engine 77 may determine the round-trip time of the packets and the amount of retransmissions of packets for a second group of packets of the data flow of the application being transmitted over a link between the application server and the client device using the techniques described above. For example, SLA management engine 77 may monitor the round-trip times of the packets of the data flow for a second group of packets of the data flow to determine a round-trip time for the second group of packets of the data flow. Similarly, SLA management engine 77 may determine the amount of retransmission during transmission of the second group of packets of the data flow, such as by determining the amount of retransmission of packets of the data flow for the second group of packets.

SLA management engine 77 may determine, based at least in part on the round-trip times of the second group of packets of the data flow and the amount of retransmission during transmission of the second group of packets of the data flow, whether to update the round-trip time parameter for the SLA associated with the application, such as by storing an updated round-trip time parameter for the SLA in SLA database 79. That is, if SLA management engine 77 determines that the amount of retransmission of packets of the data flow for the second group of packets is below the retransmission threshold, SLA management engine 77 may determine whether to set the round-trip time for the SLA associated with the application to the round-trip time for the second group of packets of the data flow.

Specifically, if SLA management engine 77 determines that the amount of retransmission of packets of the data flow for the second group of packets is below the retransmission threshold, and if SLA management engine 77 determines that the round-trip time for the second group of packets of the data flow is greater than the round-trip time parameter for the SLA associated with the application, SLA management engine 77 may set the round-trip time parameter for the SLA associated with the application to the round-trip time parameter for the second group of packets of the data flow. In this way, SLA management engine 77 may continuously determine the round-trip time parameter for the SLA associated with the application.

Thus, for example, if SLA management engine 77 determines that the round-trip time for a first group of packets of the data flow is 30 ms, and that the amount of retransmission of packets of the data flow for the first group of packets is below the retransmission threshold, SLA management engine 77 may set the round-trip time parameter for the SLA associated with the application to 30 ms by storing the round-trip time parameter of 30 ms to SLA database 79.

Subsequently, SLA management engine 77 determines that the round-trip time for a second group of packets of the data flow is 50 ms. However, if SLA management engine 77 determines that the amount of retransmission of packets of the data flow for the second group of packets is at or above the retransmission threshold, SLA management engine 77 may refrain from setting the round-trip time parameter for the SLA associated with the application to 50 ms, such as refraining from storing the round-trip time parameter of 50 ms to SLA database 79. Subsequently, if SLA management engine 77 determines that the round-trip time for a third group of packets of the data flow is 40 ms, and that the amount of retransmission of packets of the data flow for the third group of packets is below the retransmission threshold, SLA management engine 77 may set the round-trip time parameter for the SLA associated with the application to 40 ms by storing the round-trip time parameter of 40 ms to SLA database 79. In this way, SLA management engine 77 may continuously determine the round-trip time parameter for the SLA associated with the application.

In some examples, SLA management engine 77 may monitor multiple data flows of an application over different links in SD-WAN system 2 to adaptively determine the round-trip time parameter for the SLA associated with the application. For example, SLA management engine 77 may determine the round-trip time of the packets and the amount of retransmissions of packets for packets of a first data flow of the application being transmitted over a first link using the techniques described above. SLA management engine 77 may also determine the round-trip time of the packets and the amount of retransmissions of packets of a second data flow of the application being transmitted over a second link using the techniques described above, where the transmission of the first data flow and the second data flow through the first link and the second link are at least partially concurrent.

SLA management engine 77 may, in response to determining that the amount of retransmission of packets in the first data flow is below the retransmission threshold, set the round-trip time parameter for the SLA associated with the application to the round-trip time for the first data flow. Subsequently, if SLA management engine 77 determines that the amount of retransmission of packets in the second data flow is below the retransmission threshold, determine whether to set the round-trip time parameter for the SLA associated with the application to the round-trip time for the second data flow. Specifically, if SLA management engine 77 determines that the round-trip time for the second data flow is larger than the round-trip time parameter for the SLA associated with the application, SLA management engine 77 may set the round-trip time parameter for the SLA associated with the application to the round-trip time for the second data flow. In this way, SLA management engine 77 may utilize data flows of an application that are transmitted over multiple different links to determine the round-trip time parameter for the SLA associated with the application.

As described above, SD-WAN device 60 may store parameters such as the round-trip time parameter, jitter parameter, and the like for the SLA associated with an application in SLA database 79. SD-WAN device 60 may also be able to store parameters of SLAs associated with different applications in SLA database 79. SD-WAN device 60 may be able to identify the applications associated with the data flows via any suitable techniques such as by receiving the identity of such applications from, for example, an application server, by performing deep packet inspection, and the like. In some examples, for applications that SD-WAN device 60 is unable to identify, SD-WAN device 60 may be able to determine an application signature based at least in part on the data flow of the application and may associate parameters for an SLA with the application in SLA database 79.

In some examples, SD-WAN device 60 may determine and record traffic patterns of data flows of an application in order to determine an application signature for the application and/or to identify future traffic flows from the same application. For example, SLA management engine 77 may record traffic patterns of a data flow of an application, such as packets per second, inter-packet delay, bursts of packets within the data flow, session duration of the data flow, and the like to determine an application signature for the application. When SD-WAN device 60 monitors data flows in the future, SD-WAN device 60 may analyze the traffic patterns of the data flow to identify the application (or application signature) associated with the data flow.

By identifying the application associated with a data flow monitored by SD-WAN device 60, SD-WAN device 60 may determine whether there is an associated SLA stored in SLA database 79. SD-WAN device 60 may, in response to identifying an application associated with a data flow monitored by SD-WAN device 60, determine whether an SLA associated with the application is stored in SLA database 79.

In response to determining that an SLA associated with the application is stored in SLA database 79, SD-WAN device 60 may assign the data flow of the application to a particular link having quality of experience metrics that meet the SLA associated with the application. That is, SD-WAN device 60 may assign the data flow of the application to a particular link that meets the round-trip time and/or jitter parameters of the SLA associated with the application. For example, SD-WAN device 60 may send an indication of the SLA associated with the application to a network device, such as SD-WAN appliance 56 of FIG. 2, that can select and/or change the link through with the data flow of the application is transmitted. The network device may, in response to receiving the SLA associated with the application, assign the data flow of the application to a particular link having quality of experience metrics that meet the SLA associated with the application. In this way, by adaptively determining one or more parameters of the SLA of an application, SD-WAN device 60 enables data flows of the application to be transmitted over links that are well suited to the application.

Figure 4:
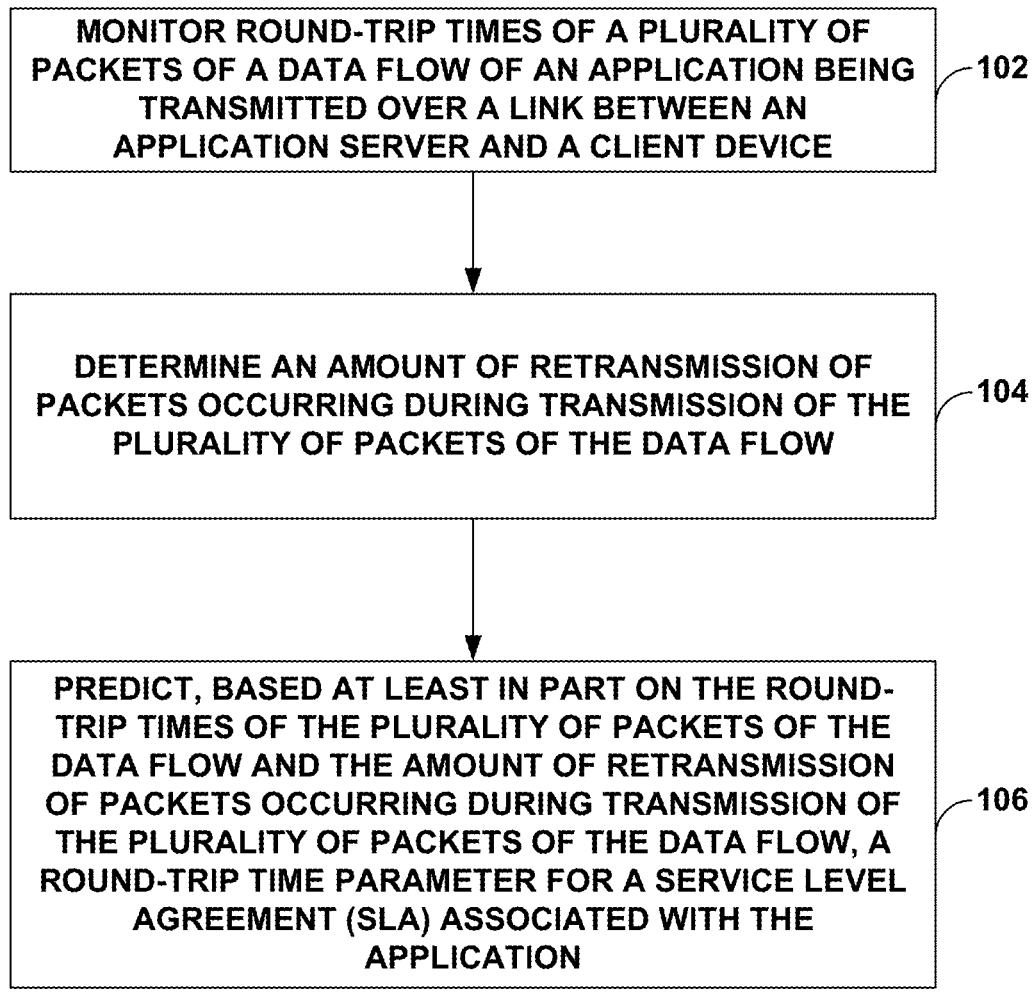
FIG. 4 is a flow diagram illustrating an example technique for a software-defined wide area network system that adaptively determines service level agreements for applications, in accordance with the techniques of this disclosure.

FIG. 4 is a flow diagram illustrating an example technique for a software-defined wide area network system that adaptively determines service level agreements for applications, in accordance with the techniques of this disclosure. These techniques may be described with respect to SD-WAN device 60 of FIG. 3.

In accordance with the techniques described herein, SD-WAN device 60 may monitor round-trip times of a plurality of packets of a data flow of an application being transmitted over a link between an application server and a client device (102). SD-WAN device 60 may determine an amount of retransmission of packets occurring during transmission of the plurality of packets of the data flow (104). For example, SD-WAN device 60 may determine an amount of retransmission of packets occurring during transmission of the plurality of packets of the data flow.

SD-WAN device 60 may predict, based at least in part on the round-trip times of the plurality of packets of the data flow and the amount of retransmission of packets occurring during transmission of the plurality of packets of the data flow, a round-trip time parameter for a service level agreement (SLA) associated with the application (106).

For example, SD-WAN device 60 may determine whether the amount of retransmission of packets occurring during transmission of the plurality of packets the data flow is below a predefined retransmission threshold and may, in response to determining that the amount of retransmissions of packets occurring during transmission of the plurality of packets the data flow is below the predefined retransmission threshold, predict, based at least in part on the round-trip times of the plurality of packets of the data flow, the round-trip time parameter for the SLA associated with the application. For example, SD-WAN device 60 may determine a round-trip time based on the round-trip times of the plurality of packets of the data flow of the application and may set the round-trip time parameter for the SLA to the round-trip time.

In some examples, SD-WAN device 60 may, in response to predicting the round-trip time parameter for the SLA associated with the application, monitor the round-trip times of a second plurality of packets of the data flow of the application. SD-WAN device 60 may determine the amount of retransmission during transmission of the second plurality of packets of the data flow. SD-WAN device 60 may determine, based at least in part on the round-trip times of the second plurality of packets of the data flow and the amount of retransmission occurring during transmission of the second plurality of packets of the data flow, whether to update the round-trip time for the SLA associated with the application.

In some examples, SD-WAN device 60 may determine an amount of retransmission of packets during transmission of the second plurality of packets of the data flow. SD-WAN device 60 may determine whether the amount of retransmission of packets occurring during transmission of the second plurality of packets of the data flow is below a predefined retransmission threshold. SD-WAN device 60 may determine a round-trip time based on the round-trip times of the second plurality of packets of the data flow of the application. SD-WAN device 60 may, in response to determining that the amount of retransmission of packets occurring during transmission of the second plurality of packets of the data flow is below a predefined retransmission threshold and that the round-trip time is larger than the round-trip time parameter for the SLA associated with the application, set the round-trip time parameter for the SLA to the round-trip time.

In some examples, the second plurality of packets of the data flow of the application comprises the second plurality of packets of the data flow of the application being transmitted over the link between the application server and the client device. In some examples, the second plurality of packets of the data flow of the application being transmitted between the application server and the client device comprises the second plurality of packets of the data flow of the application being transmitted over a second link.

In some examples, the plurality of packets of the data flow are transported via Transmission Control Protocol.

In some examples, SD-WAN device 60 may assign a second data flow of the application to a particular link having quality of experience metrics that meet the SLA associated with the application.

In some examples, SD-WAN device 60 comprises a software-defined networking (SDN) device or any other Software-Defined Wide Area Networking device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
monitoring, by a network device, round-trip times of a plurality of packets of a data flow of an application being transmitted over a link between an application server and a client device;
determining, by the network device, an amount of retransmission of packets occurring during transmission of the plurality of packets of the data flow;
determining, by the network device, whether the amount of retransmission of packets during transmission of the plurality of packets in the data flow is below a predefined retransmission threshold; and
in response to determining that the amount of retransmission of packets occurring during transmission of the plurality of packets the data flow is below the predefined retransmission threshold, predicting, by the network device and based at least in part on the round-trip times of the plurality of packets of the data flow, a round-trip time parameter for a service level agreement (SLA) associated with the application, including:
determining a round-trip time based on the round-trip times of the plurality of packets of the data flow of the application, and
setting the round-trip time parameter for the SLA to the round-trip time.

2. The method of claim 1, further comprising:
in response to predicting the round-trip time parameter for the SLA associated with the application, monitoring, by the network device, the round-trip times of a second plurality of packets of the data flow of the application;
determining, by the network device, an amount of retransmission of packets occurring during transmission of the second plurality of packets of the data flow; and
determining, by the network device and based at least in part on the round-trip times of the second plurality of packets of the data flow and the amount of retransmission of packets occurring during transmission of the second plurality of packets of the data flow, whether to update the round-trip time parameter for the SLA associated with the application.

3. The method of claim 2, wherein determining whether to update the round-trip time parameter for the SLA associated with the application further comprises:
determining, by the network device, whether the amount of retransmission of packets occurring during transmission of the second plurality of packets of the data flow is below a retransmission threshold;
determining, by the network device, a round-trip time based on the round-trip times of the second plurality of packets of the data flow of the application; and
in response to determining that the amount of retransmission of packets occurring during transmission of the second plurality of packets of the data flow is below the retransmission threshold and that the round-trip time is larger than the round-trip time parameter for the SLA associated with the application, setting, by the network device, the round-trip time parameter for the SLA to the round-trip time.

4. The method of claim 2, wherein the second plurality of packets of the data flow of the application comprises the second plurality of packets of the data flow of the application being transmitted over the link between the application server and the client device.

5. The method of claim 2, wherein the second plurality of packets of the data flow of the application being transmitted between the application server and the client device comprises the second plurality of packets of the data flow of the application being transmitted over a second link.

6. The method of claim 1, wherein the plurality of packets of the data flow are transported via Transmission Control Protocol.

7. The method of claim 1, further comprising:
assigning, by the network device, a second data flow of the application to a particular link having quality of experience metrics that provide at least the predicted round-trip time parameter for the SLA associated with the application.

8. A network device comprising:
a memory; and
one or more processors in communication with the memory, the one or more processors configured to:
monitor round-trip times of a plurality of packets of a data flow of an application being transmitted over a link between an application server and a client device;
determine an amount of retransmission of packets occurring during transmission of the plurality of packets of the data flow;
determine whether the amount of retransmission of packets during transmission of the plurality of packets in the data flow is below a predefined retransmission threshold; and
in response to determining that the amount of retransmission of packets occurring during transmission of the plurality of packets the data flow is below the predefined retransmission threshold, predict, based at least in part on the round-trip times of the plurality of packets of the data flow, a round-trip time parameter for a service level agreement (SLA) associated with the application, including:
determining a round-trip time based on the round-trip times of the plurality of packets of the data flow of the application, and
setting the round-trip time parameter for the SLA to the round-trip time.

9. The network device of claim 8, wherein the one or more processors are further configured to:
in response to predicting the round-trip time parameter for the SLA associated with the application, monitor the round-trip times of a second plurality of packets of the data flow of the application;
determine an amount of retransmission of packets occurring during transmission of the second plurality of packets of the data flow; and
determine, based at least in part on the round-trip times of the second plurality of packets of the data flow and the amount of retransmission of packets occurring during transmission of the second plurality of packets of the data flow, whether to update the round-trip time parameter for the SLA associated with the application.

10. The network device of claim 9, wherein the one or more processors configured to determine whether to update the round-trip time parameter for the SLA associated with the application are further configured to:
determine whether the amount of retransmission of packets occurring during transmission of the second plurality of packets of the data flow is below a retransmission threshold;
determine a round-trip time based on the round-trip times of the second plurality of packets of the data flow of the application; and
in response to determining that the amount of retransmission of packets occurring during transmission of the second plurality of packets of the data flow is below the retransmission threshold and that the round-trip time is larger than the round-trip time parameter for the SLA associated with the application, set the round-trip time parameter for the SLA to the round-trip time.

11. The network device of claim 9, wherein the second plurality of packets of the data flow of the application comprises the second plurality of packets of the data flow of the application being transmitted over the link between the application server and the client device.

12. The network device of claim 9, wherein the second plurality of packets of the data flow of the application being transmitted between the application server and the client device comprises the second plurality of packets of the data flow of the application being transmitted over a second link.

13. The network device of claim 8, wherein the plurality of packets of the data flow are transported via Transmission Control Protocol.

14. The network device of claim 8, wherein the one or more processors are further configured to:
assign a second data flow of the application to a particular link having quality of experience metrics that provide at least the predicted round-trip time parameter for the SLA associated with the application.

15. The network device of claim 8, wherein the network device comprises a Software-Defined Wide Area Network device.

16. A non-transitory computer-readable storage medium storing instructions thereon that when executed cause one or more processors, via execution of a Software-Defined Wide Area Network device, to:
monitor round-trip times of a plurality of packets of a data flow of an application being transmitted over a link between an application server and a client device;
determine an amount of retransmission of packets occurring during transmission of the plurality of packets of the data flow;
determine whether the amount of retransmission of packets during transmission of the plurality of packets in the data flow is below a predefined retransmission threshold; and
in response to determining that the amount of retransmission of packets occurring during transmission of the plurality of packets the data flow is below the predefined retransmission threshold, predict, based at least in part on the round-trip times of the plurality of packets of the data flow, a round-trip time parameter for a service level agreement (SLA) associate with the application, including:
determining a round-trip time based on the round-trip times of the plurality of packets of the data flow of the application, and
setting the round-trip time parameter for the SLA to the round-trip time.

* * * * *